United States Patent [19]

Anderson et al.

[11] 3,975,332

[45] Aug. 17, 1976

[54] EPOXIDIZED COPOLYMERS

[75] Inventors: Roy S. Anderson, Broomall, Pa.;
John F. Pendleton, Barrington, Ill.

[73] Assignee: Borg-Warner Corporation, Chicago, Ill.

[22] Filed: Jan. 20, 1975

[21] Appl. No.: 542,627

[52] U.S. Cl. .................................. 526/15; 204/181; 526/17; 526/56; 526/57
[51] Int. Cl.² ........................................... C08F 8/08
[58] Field of Search .............. 260/78.4 EP, 78.5 BB, 260/78.5 T, 80 P, 82.1

[56] References Cited
UNITED STATES PATENTS

| | | | |
|---|---|---|---|
| 2,829,130 | 4/1958 | Greenspan et al. | 260/82.1 |
| 3,210,380 | 10/1965 | Sharp et al. | 260/348.5 |
| 3,243,401 | 3/1966 | Floyd | 260/29.7 |
| 3,247,284 | 4/1966 | Heiberger et al. | 260/836 |
| 3,374,209 | 3/1968 | Hay et al. | 260/78.4 EP |
| 3,444,121 | 5/1969 | Altier et al. | 260/29.7 |
| 3,491,068 | 1/1970 | Gaylord | 260/78.5 BB |
| 3,742,086 | 6/1973 | Epel et al. | 260/836 |

*Primary Examiner*—John Kight, III
*Attorney, Agent, or Firm*—Joseph Shekleton

[57] ABSTRACT

Self-curing epoxidized copolymers of a conjugated diene and a carboxylic olefin. Curing is accomplished merely by heating at temperatures in the order of 150°C. The epoxidized copolymers are stable at ordinary temperatures.

14 Claims, No Drawings

EPOXIDIZED COPOLYMERS

This invention relates to protective coatings, moldings, castings and potting resins and more particularly to such compositions which are curable by heat curing. Still more particularly it relates to epoxidized olefinic polymers wherein the epoxy group is susceptible to a cross-linking reaction upon heating.

Epoxidized polymers of butadiene are disclosed in Greenspan et al (U.S. Pat. No. 2,829,130). They are said to be useful as raw materials in making synthetic resins which are in turn useful for castings and coatings. An epoxidized copolymer of butadiene and styrene, for example, is reacted with a saturated or unsaturated dicarboxylic acid or anhydride such as adipic acid or maleic anhydride to form the desired casting or coating resin. When a thin film of such a resin is heated at 150°C for 2 hours an "extremely hard and tough" coating is obtained and it shows "very good adhesion" to the glass substrate.

The epoxidation of olefins with molecular oxygen in a liquid reaction medium containing a nitrile is shown in Sharp et al, U.S. Pat. No. 3,210,380. Included among the olefins said to be susceptible to such conversion are butadiene-styrene copolymers.

Floyd, U.S. Pat. No. 3,243,401, also shows the epoxidation of butadiene copolymers, in latex form. A butadiene-styrene copolymer is thus epoxidized then mixed with a small proportion of melamine-formaldehyde resin and cured (as a film on a glass substrate) by heating for 15 minutes at 150°C.

Heiberger et al, U.S. Pat. No. 3,247,284, shows a curing formulation consisting of an unsaturated dicarboxylic anhydride having a polymerizable double bond, an aliphatic polyhydric alcohol, a free radical initiating agent and a vinylbenzene monomer. This curing formulation is said to be effective to cure epoxypolybutadiene yielding a product which is useful in laminates and potting compounds. A typical example shown (Example 3) is the mixture of epoxybutadiene, propylene glycol, styrene, maleic anhydride and a catalytic amount of di-tertiary butyl peroxide; on heating for 2.8 hours at 40°C, 1 hour at 60°C, and 2 hours at 115°C, a casting exhibited good flexural properties.

Also, Epel et al, U.S. Pat. No. 3,742,086, shows the formulation of a thermoset resin by the reaction of an epoxidized polymer with an organic acid and a copolymerizable monomer. A typical example is a mixture of an epoxidized butadiene, acrylic acid and styrene in the presence of tertiary butyl benzoate. The compounded mixture is cured in a mold by heating for 5 minutes at 350°F to yield a relatively homogeneous thermoset composition.

Despite the advantages afforded by the above compositions, however, there exists a need for improved resin compositions which are adaptable to the above applications. There is also a need for improved compositions for use in electrophoretic coatings.

It is therefore a principal object of the present invention to provide a novel composition of matter.

It is another object of the present invention to provide a film-forming composition.

Still another object of the present invention is to provide an ionic polymeric composition which is suitable for use in electrophoretic coating processes.

These and other objects are accomplished by the present invention which consists of an epoxidized copolymer of (1) a conjugated diene having the formula

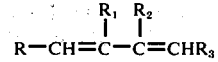

where R, $R_1$, $R_2$ and $R_3$ are hydrogen, halogen, alkoxy, aryl, cycloalkyl or alkyl having from 1 to 8 carbon atoms, and (2) a carboxylic olefin having the formula

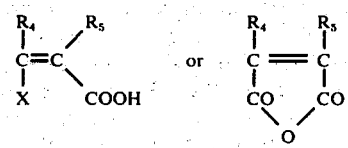

where $R_4$ and $R_5$ are hydrogen, chlorine or lower alkyl, and X is hydrogen or carboxyl.

The conjugated diene preferably contains up to 10 carbon atoms. Illustrative examples include butadiene, 2-chloro-1,3-butadiene, 2,3-dichlorobutadiene, 2,3-dimethylbutadiene, piperylene, 2,4-hexadiene, 2-methyl-1,3-pentadiene, 2-ethyl-1,3-butadiene, 2-propyl-1,3-butadiene, 2-phenyl-1,3-butadiene, 3-methyl-1,3-pentadiene, 2-ethyl-1,3-pentadiene, 2-methyl-1,3-hexadiene, 1-methoxy-1,3-butadiene and isoprene. Butadiene, isoprene, 2-chloro-1,3-butadiene and piperylene, i.e., those conjugated dienes having less than six carbon atoms, are preferred, because the copolymers which can be prepared from these dienes are inexpensive, easily prepared and readily epoxidized. Where the property of flame-retardance is desired, a chlorine-containing diene (plus a chlorine-containing carboxylic olefin) is indicated. The term "lower alkyl" indicates an alkyl group of less than six carbon atoms.

The carboxylic olefin may be, e.g., maleic acid, acrylic acid, methacrylic acid or methyl maleic acid; or it may be maleic anhydride or a substituted maleic anhydride. In the case of maleic acid and substituted maleic acids, the copolymers are prepared from the corresponding anhydrides, i.e., maleic anhydride and the particular substituted maleic anhydride. Then the resulting copolymer containing carboxylic anhydride groups is hydrolyzed to a copolymer containing carboxylic acid groups. In some such instances, a significant proportion of anhydride groups remain in the copolymer.

In general, the percentage of conjugated diene units in the copolymer is from about 1% to about 99%, on a molar basis. Preferably, this percentage is within the range of from about 25% to about 99%. Where the carboxylic olefin is maleic acid, the percentage will be 50% because, as explained more fully in Gaylord, U.S. Pat. No. 3,491,068, the copolymerization of conjugated dienes with maleic anhydride produces a 1:1 copolymer, i.e., one wherein the molar percentage of diene units is 50%.

The molecular weight of the polymer is such as to have an intrinsic viscosity of at least about 0.05. Ordinarily, the intrinsic viscosity will range from about 0.1 to about 1.0 but may in some instances be as high as 6.0.

The copolymers of a conjugated diene and a carboxylic olefin may be prepared as described in the above Gaylord patent, by reacting equimolar proportions of maleic anhydride with a conjugated diene such as butadiene in the presence of a free radical generator. Copolymers of a conjugated diene and acrylic or methacrylic acid may be prepared as described in Cooper, *J. Pol. Sci.*, 28, 195 (1958) and Marvel et al, *J. Pol. Sci.*, 8, 599 (1952).

Epoxidation of the copolymer is accomplished, typically, by mixing it with a 7% (by weight) solution of peracetic acid in mixed acetic acid/acetic anhydride, prepared as described in *Organic Reactions*, Vol. VII, Chapter 7, p. 378 et seq. The mixture is stirred at room temperature for 48–72 hours. After two hours the copolymer is substantially completely dissolved and thereafter the epoxidation product precipitates as it is formed. At the end of the 48-hour period, the epoxidized polymer is collected on a filter, washed with deionized water, then with methanol, then dried in a vacuum oven.

The epoxide content of the epoxidized copolymer may vary from about 5%, based on the available olefinic content of the copolymer, to 100%.

Examples of the epoxidized copolymers of the invention, prepared as above, include the following:

|  | Viscosity |
|---|---|
| Epoxidized 50/50 copolymer of maleic acid and butadiene | 0.32 |
| Epoxidized 50/50 copolymer of maleic acid and butadiene | 0.56 |
| Epoxidized 26/74 copolymer of methacrylic acid and butadiene | 0.28 |

It will be noted that the epoxidized copolymers of this invention are self-curing, i.e., it is unnecessary to add a separate curing agent to the copolymer to cause it to cure. In the usual case a curable polymer must be treated with a cross-linking agent of some sort to cause it to develop a three-dimensional configuration, i.e., to "set up" or become cured. Such agents include polyamines such as ethylene diamine, tetraethylene pentamine, 2,4-diaminotoluene and the like. Carboxylic acid anhydrides are also used for this purpose. Many of these curing agents are effective at low temperatures; some are effective at high temperatures, viz., 150°C or thereabouts. A particular advantage of the epoxidized copolymers herein is the fact that they are stable at room temperature; they must be heated to be cured.

The invention will be more fully understood by reference to the following specific examples.

EXAMPLE 1

A mixture of 3.4 g. (0.02 mole) of a 50/50 (molar) butadiene/maleic acid copolymer and 0.1 mole of peracetic acid (in acetic acid-acetic anhydride), prepared as described in the above *Organic Reactions* chapter, is stirred at room temperature for 64 hours. The resulting mixture is filtered, the solid washed with deionized water, then with isopropyl alcohol, and then dried. The yield is 53% of the theory; the formation of epoxide is shown by infra-red analysis.

EXAMPLE 2

The procedure of Example 1 is repeated, a 67% yield being obtained of a product having an epoxide content of 70%, based on the olefinic group content. This product is dissolved in dimethyl formamide and a clear film cast from the resulting solution. The dry film is readily soluble in dimethyl formamide, but upon heating for 16 hours at 150°C the film is cured so as to become insoluble in the same solvent.

EXAMPLE 3

An epoxidized copolymer of 65% (molar) methacrylic acid and 35% (molar) butadiene, readily soluble in dimethyl formamide, is rendered insoluble in that solvent by curing at 350°F for just 1 hour. Similar results are obtained with an epoxidized copolymer of 17% methacrylic acid and butadiene.

EXAMPLE 4

To 200 ml. of acetic anhydride at 40°C there is added portionwise over a period of three hours, 60 ml. of 30% aqueous hydrogen peroxide. To this solution there is added 15 g. of a copolymer of 15% (molar) methacrylic acid and 85% (molar) butadiene and the resulting mixture is stirred at room temperature for 48 hours. The mixture then is poured into water to coagulate the polymeric product which is recovered and dried in vacuum at room temperature. Infra-red analysis shows a loss of vinyl absorption and the presence of epoxy groups. A dimethylformamide solution of the epoxidized copolymer is evaporated and the residue heated for 1 hour at 375°F. The resulting dark brown material is insoluble in all common solvents.

EXAMPLE 5

The use of the epoxidized copolymers herein as an electrophoretic coating is shown by an experiment with the epoxidized copolymer described in Example 2. A solution of 1.5 g. of that copolymer and 1.5 ml. of triethyl amine in 50 ml. of deionized water is prepared for use as an electrolysis bath. The cathode is a piece of lead 1 inch wide, 2 inches long and ⅛ inch thick. The anode, on which the epoxidized coplymer is to be coated, is a piece of mild steel (R-19 plate steel SA-283, ASTM A283-67) of similar dimensions. The steel anode is electrocoated at 10 volts and 160 ma. (milliamps) for 30 seconds, washed with water, dried and cured by heating at 400°F in air for 1 hour. The surface of the steel was almost completely covered with a smooth, thin, uniform coating.

A similar experiment was carried out wherein the mild steel anode was replaced by a stainless steel anode. It was electroplated at 7 volts and 190 ma. for 5 minutes. The resulting coating covered the entire surface of the stainless steel coupon, and was smooth and uniform.

The purpose of the trimethyl amine in the above electrolysis baths is to solubilize the epoxidized copolymer. Other suitable amines for this purpose include pyridene trimethyl amine, morpholine, tri-n-butyl amine and the like. Tertiary amines are preferred so as to avoid the possibility of reaction with the epoxy groups.

The epoxidized copolymers of this invention may be cured at lower temperatures by the use of a separate curing agent. This is illustrated by the following example.

EXAMPLE 6

A mixture of 1.0 g. of an epoxidized 50/50 (molar) copolymer of butadiene and maleic acid and 0.07 g. of triethylene tetramine is ground thoroughly to insure intimate mixing and permitted to stand for 17 hours. At the end of this period, the copolymer is insoluble in dimethyl formamide whereas the same copolymer, untreated with triethylene tetramine, is soluble.

Similarly, a dry intimate mixture of 1.0 g. of the above epoxidized copolymer and 0.03 g. of a boron trifluoride-ethyl amine complex is heated at 100°C for 17 hours, after which the copolymer is insoluble in dimethyl formamide. A copolymer sample heated alone at 100°C for 17 hours is still soluble in dimethyl formamide.

We claim:

1. An epoxidized copolymer obtained by epoxidation of from about 5% to 100% of the olefinic double bonds in a copolymer of (1) from about 1% to about 99%, on a molar basis, of a conjugated diene having the formula

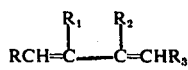

where R, $R_1$, $R_2$ and $R_3$ are hydrogen, halogen, alkoxy, aryl, cycloalkyl or alkyl having from 1 to 8 carbon atoms, and (2) a carboxylic olefin having the formula

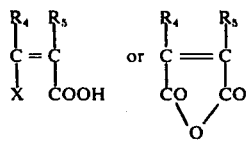

where $R_4$ and $R_5$ are hydrogen, chlorine or lower alkyl, and X is hydrogen or carboxyl, said copolymer having an intrinsic viscosity of from about 0.05 to about 6.0.

2. The epoxidized copolymer of claim 1 wherein the conjugated diene contains less than 10 carbon atoms.

3. The epoxidized copolymer of claim 1 wherein the conjugated diene is a hydrocarbon.

4. The epoxidized copolymer of claim 1 wherein the conjugated diene is 1,4-butadiene.

5. The epoxidized copolymer of claim 1 wherein the conjugated diene is chloroprene.

6. The epoxidized copolymer of claim 1 wherein the conjugated diene is isoprene.

7. The epoxidized copolymer of claim 1 wherein the carboxylic olefin is maleic acid.

8. The epoxidized copolymer of claim 1 wherein the carboxylic olefin is a monocarboxylic olefin.

9. The epoxidized copolymer of claim 1 wherein at least about 10% of the olefinic double bonds of said copolymer are epoxidized.

10. The epoxidized copolymer of claim 9 wherein the predominant recurring unit is

11. An epoxidized copolymer obtained by epoxidation of from about 5% to 100% of the olefinic double bonds in a 50/50 (molar) copolymer of 1,4-butadiene and maleic anhydride, said copolymer having an intrinsic viscosity of from about 0.05 to about 6.0.

12. An epoxidized copolymer obtained by epoxidation of from about 5% to 100% of the olefinic double bonds in a copolymer of (1) from about 1% to about 99%, on a molar basis, of 1,4-butadiene and (2) acrylic acid.

13. A method for preparing a thermoset resin comprising heating at a temperature of from about 100° to about 300°C the epoxidized copolymer of claim 1.

14. A method for preparing a thermoset resin comprising heating at a temperature of from about 100° to about 300°C the epoxidized copolymer of claim 9.

* * * * *